(12) United States Patent
Greco et al.

(10) Patent No.: US 7,143,232 B2
(45) Date of Patent: Nov. 28, 2006

(54) METHOD, SYSTEM, AND PROGRAM FOR MAINTAINING A DIRECTORY FOR DATA WRITTEN TO A STORAGE MEDIUM

(75) Inventors: Paul Merrill Greco, Tucson, AZ (US); Glen Alan Jaquette, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 389 days.

(21) Appl. No.: 10/374,479

(22) Filed: Feb. 25, 2003

(65) Prior Publication Data
US 2004/0165304 A1  Aug. 26, 2004

(51) Int. Cl.
*G06F 13/00* (2006.01)

(52) U.S. Cl. ....................... 711/111; 711/207
(58) Field of Classification Search .............. 711/1, 711/3, 205, 207, 113, 112, 162; 360/72.1; 707/203; 714/6, 13
See application file for complete search history.

(56) References Cited

U.S. PATENT DOCUMENTS

| | | | |
|---|---|---|---|
| 5,388,016 A * | 2/1995 | Kanai et al. | 360/72.1 |
| 5,535,369 A * | 7/1996 | Wells et al. | 711/171 |
| 5,546,557 A | 8/1996 | Allen et al. | |
| 5,664,144 A * | 9/1997 | Yanai et al. | 711/113 |
| 6,052,799 A * | 4/2000 | Li et al. | 714/13 |
| 6,341,325 B1 * | 1/2002 | Franaszek et al. | 711/3 |
| 6,691,137 B1 * | 2/2004 | Kishi | 707/203 |
| 6,904,508 B1 * | 6/2005 | Selkirk et al. | 711/206 |
| 2003/0005257 A1 * | 1/2003 | Wilson et al. | 711/205 |
| 2003/0097517 A1 * | 5/2003 | Haneda | 711/1 |

FOREIGN PATENT DOCUMENTS

| | | |
|---|---|---|
| JP | 4360069 | 12/1992 |
| JP | 5159535 | 6/1993 |

OTHER PUBLICATIONS

U.S. Appl. No. 10/178,715, filed on Jun. 25, 2002, entitled "Window Based Directory for Magnetic Tape," invented by Paul M. Greco.

* cited by examiner

*Primary Examiner*—Mano Padmanabhan
*Assistant Examiner*—Craig E Walter
(74) *Attorney, Agent, or Firm*—David W. Victor; Konrad Raynes & Victor LLP (57) ABSTRACT

Provided are a method, system, and program for encoding data onto a storage medium. Host data is received and a plurality of device blocks are generated to include the host data. A directory is generated including entries for physical locations on the storage medium, wherein each entry identifies one device block at the physical location corresponding to the entry, and wherein the directory is used to access data on the storage medium. The directory entries are encoded in the device blocks written to the storage medium.

26 Claims, 6 Drawing Sheets

METHOD, SYSTEM, AND PROGRAM FOR MAINTAINING A DIRECTORY FOR DATA WRITTEN TO A STORAGE MEDIUM

BACKGROUND OF THE INVENTION

1. Field of the Invention

The present invention relates to a method, system, and program for maintaining a directory for data written to a storage medium.

2. Description of the Related Art

A host system writes data to tape in blocks of data referred to as logical blocks. The tape drive will package one or more logical blocks into one or more device blocks (also known as data sets) and write the device blocks sequentially to the tape medium. The data may be written in different patterns to the tape medium. On a helical scan tape, data is stored along vertical or diagonal tracks on the tape, on parallel tape data is stored on tracks in parallel during one scan on the tape, and on serpentine tape data is written in a forward and then reverse direction in a serpentine pattern across bands or tracks on the magnetic tape medium. A serpentine tape drive first read/writes a track in a forward direction within a section of a band, referred to as a wrap, then read/writes the next track in a reverse direction, and so on, leading to a serpentine pattern for the data layout. In tape technology, a wrap comprises one of the bands that extend the entire length of the tape and a wrap section comprises a section of the wrap.

The tape drive controller maintains a tape directory that provides information on the device blocks at specific physical locations on tape. The tape directory has entries corresponding to specific physical locations on the tape, where each entry indicates the device block number, file mark count, logical block, and other information on the data maintained at the physical location corresponding to the specific entry. In the event that the tape directory is corrupted, lost or is otherwise inaccessible, the tape drive controller must rebuild the entries in the tape directory.

This rebuild process is substantially time consuming because the tape drive controller must rewind the tape to the beginning and then read each device block to rebuild the tape directory entries before hosts may access the tape. As the densities, capacities, and lengths of tape media increases, the rebuild process needs to process an ever increasing amount of device blocks, thereby further increasing the time required to rebuild the tape directory.

For these reasons, there is a need in the art for improved techniques for managing tape directories and reducing the time and operations needed to rebuild the tape directory.

SUMMARY OF THE PREFERRED EMBODIMENTS

Provided are a method, system, and program for encoding data onto a storage medium. Host data is received and a plurality of device blocks are generated to include the host data. A directory is generated including entries for physical locations on the storage medium, wherein each entry identifies one device block at the physical location corresponding to the entry, and wherein the directory is used to access data on the storage medium. The directory entries are encoded in the device blocks written to the storage medium.

In further implementations, each directory entry indicates the host data in the device block at the physical location corresponding to the entry.

Still further, encoding the entries within the device blocks may be performed for a current device block by determining a previous directory entry encoded in a last device block written to the storage medium. If the previous directory entry is a last entry in the directory, then a first entry is encoded in the directory into the current device block. If the previous directory entry is not the last entry, then one directory entry following the previous directory entry is encoded into the current device block.

Further provided are a method, system, and program for rebuilding a directory having entries providing information on data written to a storage medium at corresponding physical locations of the storage medium. A plurality of device blocks written to the storage medium are read, wherein each device block is encoded with at least one directory entry. The directory entry encoded in the read device blocks is written into the tape directory to rebuild the tape directory.

Described implementations provide improved techniques for maintaining and rebuilding tape directory entries.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
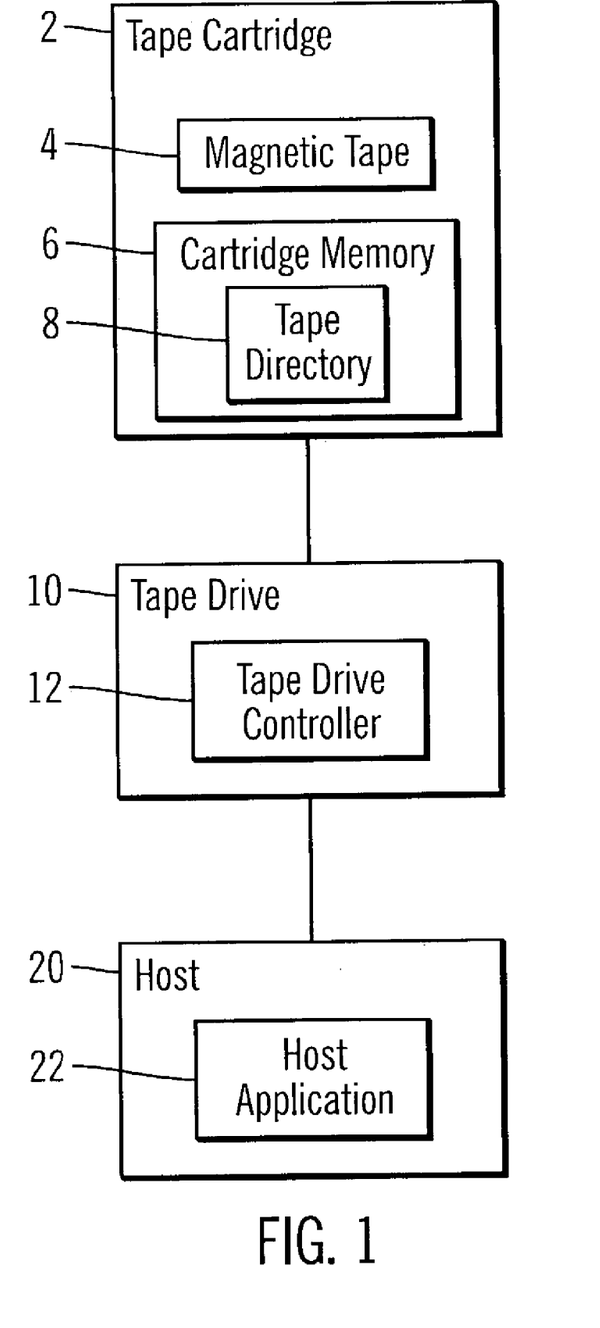
FIG. 1 illustrates a computing environment in which aspects of the invention are implemented.

FIG. 1 illustrates an architecture of a tape storage system in which aspects of the invention are implemented. A tape cartridge 2 includes a high capacity single reel of magnetic tape 4 and a non-volatile read/writable cartridge memory 6 which maintains information about the format and layout of data on the magnetic tape. In further implementations, the tape cartridge 2 may comprise a dual reel tape cartridge. In certain implementations, the tape cartridge 2, may include aspects of the Linear Tape Open (LTO) Ultrium format.

The cartridge memory 6 includes a tape directory 8 that provides information on the data maintained at determinable physical locations on the tape 4. In FIG. 1, the tape directory 8 is illustrated as included in the cartridge memory 6 module that is separate from the tape 4. In alternative implementations, the tape directory 8 may be stored on the tape 4, such as at the beginning of the tape 4.

The tape cartridge 2 may be inserted in a tape drive 10, that includes read/write heads (not shown) capable of transferring data to and from the magnetic tape 4 in a manner known in the art. The tape drive 10 further includes one or more tape drive controllers 12 that receive Input/Output (I/O) requests from a host system 20 and is capable of executing the received I/O requests by rewinding the tape and positioning the tape heads at a particular location on the magnetic tape 4 using tape drive mechanisms and algorithms to estimate the likely location of a file on the tape 4 in a manner known in the art. The tape drive 10 may be enclosed within the host system 20 or be a standalone unit or in a tape library (not shown). The tape drive 10 may connect with the host 20 through a direct interface, e.g., SCSI, Fibre Channel, etc., such as the case if the tape drive 10 is connected to the host 20 or connect over a network, such as a Local Area Network (LAN), Storage Area Network (SAN), Wide Area Network (WAN), the Internet, an Intranet, etc.

The host 20 includes a host application 22, which may comprise a backup program, that transfers data to the tape drive 10 to sequentially write to the magnetic tape 4. The host application 22 may utilize the Small Computer System Interface (SCSI) tape commands to communicate I/O requests to the tape drive 10, or any other data access command protocol known in the art. To retrieve data records, the host application 22 may read the magnetic tape 4 sequentially or in a random manner the magnetic tape 4.

Figure 2:
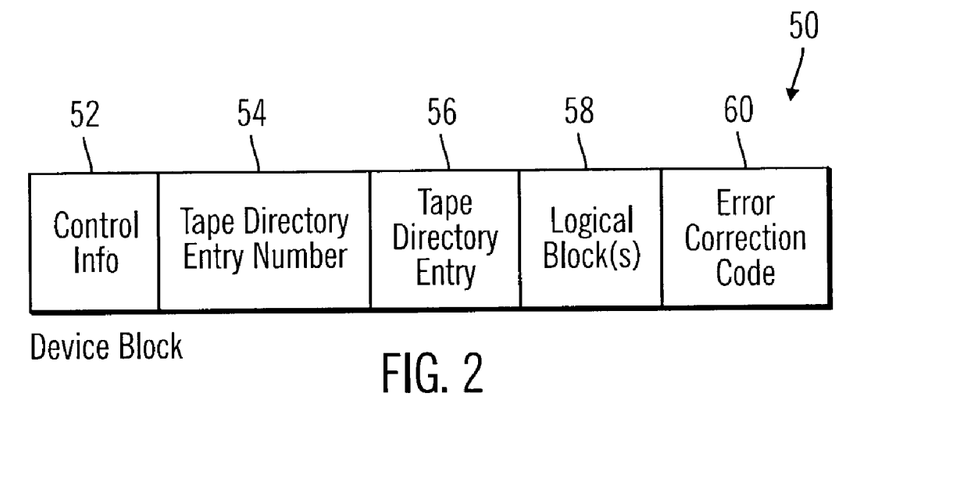
FIG. 2 illustrate fields included in device blocks written to tape storage in accordance with implementations of the invention.

FIG. 2 illustrates fields that may be included in each device block 50 stored on the tape 4 in accordance with implementations of the invention. The device block 50 maintains control information 52, which includes information about the content of the device block, such as the number of logical blocks, identity of the logical blocks, number of accumulated file marks on tape (where a filemark delineates the end of a file such that the logical blocks between two file marks may comprise a file), etc. The control information 52 may include additional control information known in the art. The device block 50 further includes one or more table directory entry numbers 54 indicating the table directory entry(s) that are stored within the device block 50. The content of the table directory 8 entries identified in field 54 are also encoded within the device block 50 in field 56. In this way, the table directory entries are distributed throughout the device blocks, such that one or more table directory entries may be stored in one or more device blocks 50. The device block 50 further includes one or more logical blocks 58. As discussed, one logical block may span multiple device blocks or one device block may include one or more logical blocks. An error correction code 60 is used to error check and correct the data maintained in the device block 50 on the tape 4.

Figure 3:
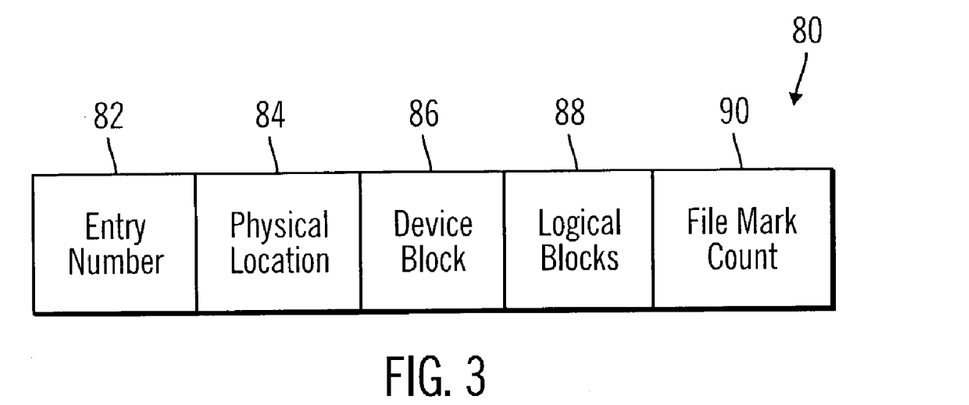
FIG. 3 illustrates fields included in tape directory entries that are used with implementations of the invention.

FIG. 3 illustrates the fields that may be included in each table directory entry 80, including:

Entry Number 82: This identifies the entry number in the table directory 8. This value may be indirectly calculated.

Physical Location 84: identifies a physical location on tape corresponding to the entry, such as a wrap number and location within the wrap. If the physical locations for which entries are maintained are at distances on the tape, i.e., at fixed offsets from one another, then the physical location for an entry may be inferred from the entry number. Physical locations may also be based on criteria or selection other than fixed offsets or distances from a previous physical location. The copending and commonly assigned patent application entitled "Window Based Directory for Magnetic Tape", having U.S. application Ser. No. 10/178,715, filed on Jun. 25, 2002, which application is incorporated herein by reference in its entirety, provides further techniques for determining the physical locations.

Device Block Number 86: Identifies the device block number, also known as data set, stored on tape at the physical location.

Logical Block Information 88: Identifies the logical block stored on tape at the physical location. If there are multiple logical blocks within a device block, then the logical block identified in field 88 may be the logical block that spans or is a first logical block starting in the referenced device block, or the first logical block partially contained in the block. Additional information about the referenced logical block may also be included in this field, i.e., does the logical block start or end in this data set, how many logical blocks are in this data set, etc.

Filemark Count 90: is a cumulative value indicating the number of file marks written on the tape 4 up to the point of the physical location.

Figure 4:
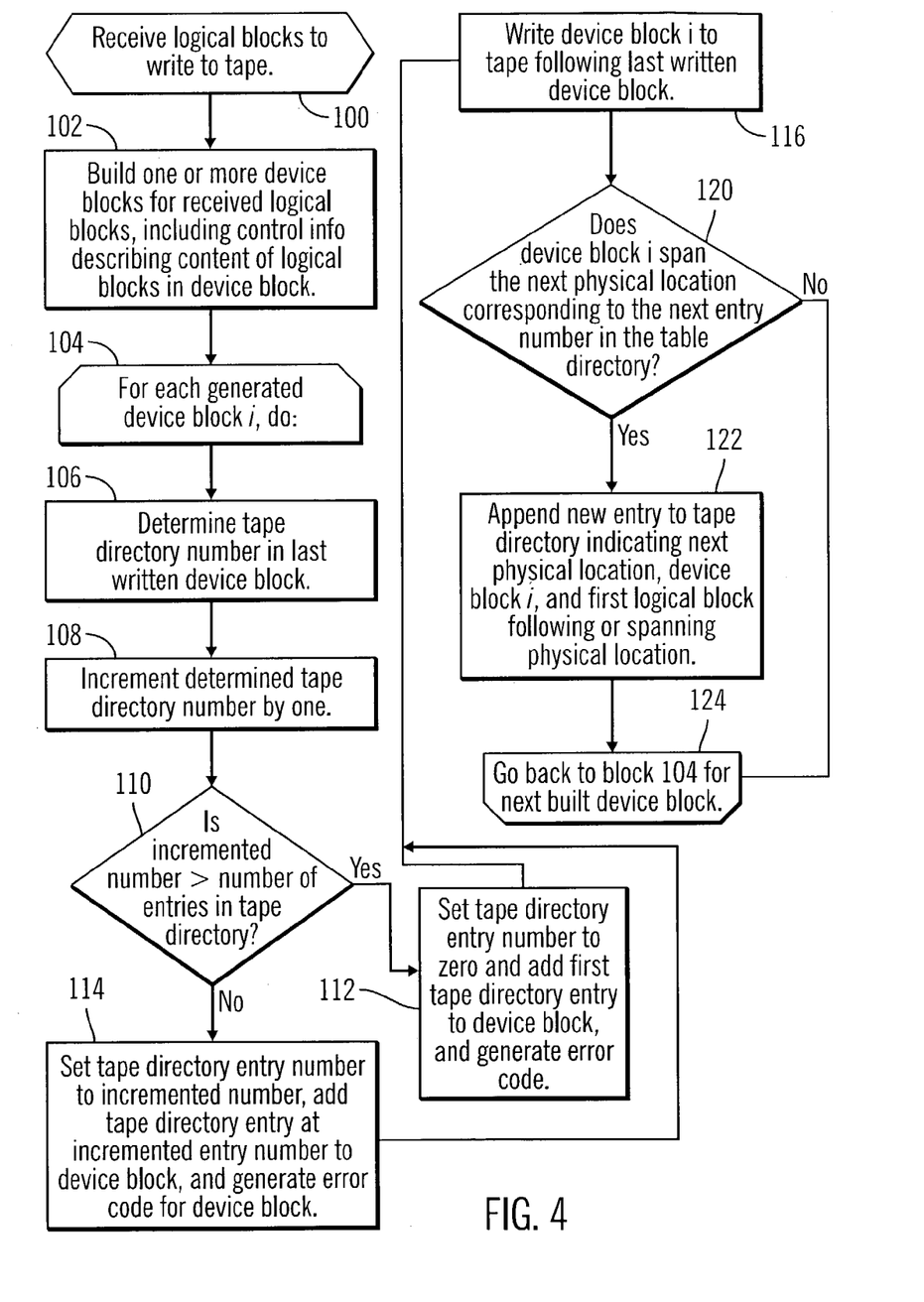
FIG. 4 illustrates logic to generate device blocks and table directory entries in accordance with implementations of the invention.

FIG. 4 illustrates logic implemented by the tape drive controller 12 to generate device blocks 50 and information in the tape directory 8 in accordance with implementations of the invention. Control begins at block 100 when the tape drive 10 receives logical blocks from the host application 22 to write to tape 4. In response, the tape drive controller 12 would build (at block 102) one or more device blocks 50 (FIG. 2) in which to store the received logical blocks, including device block control information 52. As mentioned one device block may include one or more logical blocks or a logical block may span multiple device blocks. For each generated device block i, a loop is performed at blocks 104 through 124. At block 106, a determination is made of the number of the tape directory entry written to the last written device block, which may be determined from field 54 of the last written device block or determined from a variable being maintained of the last written device block. The determined entry number is incremented (at block 108) by one. If (at block 110) the incremented number is greater than the number of entries in the tape directory 8, then the tape directory entry number field 54 is set (at block 112) to zero, or the number of the very first tape directory 8 entry, and the first entry in the tape directory 8 is added to the device block at field 56 (FIG. 2). Otherwise, if the incremented number is less than or equal to the number of entries in the tape directory 8, then the tape directory entry number field 54 is set (at block 114) to the incremented number, and the tape directory 8 entry corresponding to the incremented number is added to the device block at field 56 (FIG. 2). The error code 60 may further be generated at this point because the content of the device block i has been generated.

With the above logic, tape directory 8 entries are written sequentially to device blocks, and when the last entry in the tape directory 8 is written to a device block, the tape drive controller 12 cycles back to the first entry in the tape directory 8 to write the first entry to the next device block. In this way, the tape directory entries are repeatedly written sequentially to the device blocks, thereby repeatedly distributing the tape directory 8 entries throughout the device blocks written to tape 4.

After block 112 or 114, the built device block i is then written (at block 116) to tape 4 following last written device block. Alternatively, the content of the device block may be written as the content is being generated. If (at block 120)

the device block i spans a physical location corresponding to the next entry to add to the tape directory 8, then the tape drive controller 12 appends (at block 122) a new entry to the tape directory 8 indicating the physical location spanned by device block i, identification of device block i, and identification of the first logical block following or spanning the physical location corresponding to this added entry. As mentioned, the physical locations corresponding to tape directory 8 entries may be at known equally spaced intervals from the start of the tape, e.g., such as a fixed number of physical locations per wrap, etc., and thus capable of being inferred. Alternatively, a list or index of physical locations may be provided. From the no branch of block 120 or from block 122, control returns (to block 122) to block 104 to process any further generated device blocks.

With the logic of FIG. 4, each device block includes only one tape directory entry. In alternative implementations, multiple tape directory entries may be written to each device block. In such implementations, the algorithm of FIG. 4 would have to be adjusted to accommodate that multiple entries are in each device block. For instance, the device block entry 50 would need to include multiple table directory entry numbers and the corresponding multiple entries. In further implementations, algorithms other than simple incrementing may be used. Such algorithms may have different recovery connotations. For instance, with simple incrementing, N sequential blocks are read to recover the entire directory. Alternatively, with the incrementing algorithm, reading N/2 sequential device blocks recovers a sequential half of the directory (i.e., first half, last half or middle half, etc.), depending on the starting point, representing only a sequential half of the written data on the tape. Using alternative algorithms, reading N/2 sequential device blocks still recovers half the directory, but now contains directory entries containing reference points distributed across the entire written data on the tape (i.e., every other entry, etc.), albeit with further distance between reference points.

Figure 5:
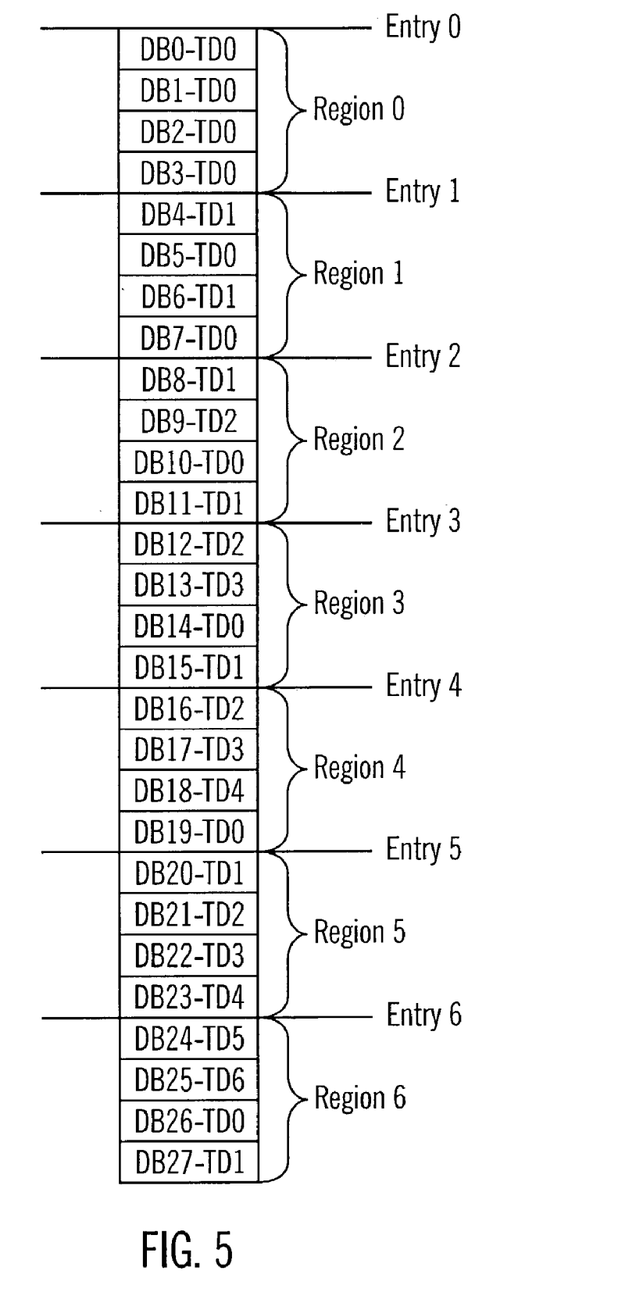
FIG. 5 illustrates an example of how device blocks are written to tape in accordance with implementations of the invention.

FIG. 5 illustrates an example of tape directory entries (TD) encoded in device blocks (DBs). In the example of FIG. 5, device blocks are of fixed length and there are four device blocks in each region bounded by two adjacent physical locations for which there are corresponding entries in the tape directory 8. The device blocks (DBs) are sequentially written to tape. Using the logic of FIG. 4, in the first region, there is only one entry, entry 0. Thus, only the tape directory entry zero (TD0) is repeatedly written to the device blocks in region 0. The first device block in entry 1 would include the data for the table directory for entry one (TD1). Since TD1 is the last entry, the next one recorded is TD0, and the two entries will be alternated for the rest of the region. As shown in FIG. 5, using the logic of FIG. 4, as more entries are added to the tape directory 8, there are additional entries to be encoded in the device blocks being written to tape. In this way, table directory entries are continually distributed throughout the device blocks being written to tape 4. Although in FIG. 5 each region has a same number of device blocks, in alternative implementations, different regions of the tape may have a different number of device blocks or data sets, and the regions may have a different physical and logical size.

Figure 6:
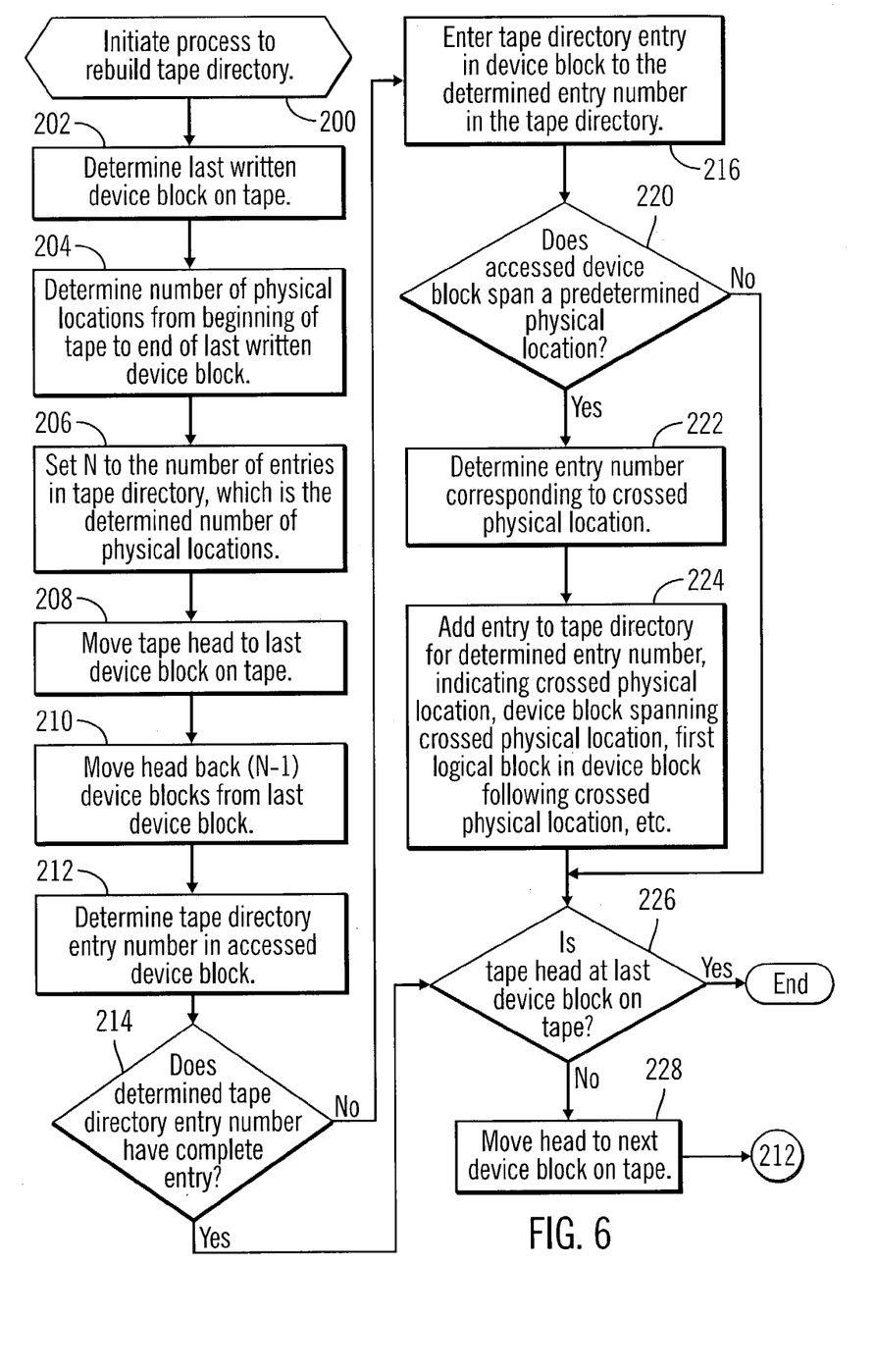
FIG. 6 illustrates logic to rebuild a tape directory in accordance with implementations of the invention.

FIG. 6 illustrates logic implemented in the tape drive controller 12 to rebuild the tape directory 8 in the event that the tape directory 8 becomes corrupted, damaged or is otherwise inaccessible. Control begins at block 200 when the tape drive controller 12 initiates a process to rebuild the tape directory 8. The tape drive controller 12 determines (at block 202) the last written device block on the tape 4 and determines (at block 204) the number of physical locations corresponding to tape entries between the beginning of the tape 4 to the end of the last written device block, e.g., end of tape 4. In alternative implementations, the rebuild may not be performed with respect to the entire full tape, but only for a certain area of interest on the tape. In such case, instead of determining the last written device block, at block 202, the determination may be of the last block of interest or the nearest block after the target block for a locate/append operation. Further, as discussed, the physical locations may be at fixed locations or intervals starting from the beginning of the tape.

After determining the number of physical locations, the tape drive controller 12 sets (at block 206) a variable N to the determined number of physical locations, which is also the number of entries that will be rebuilt in the tape directory 8. As discussed, entries in the tape directory 8 are generated when a device block is written across the physical locations corresponding to the directory entry. The controller 12 then moves (at block 208) the tape read/write head to the last device block on the tape 4 and then moves (at block 210) the head back N minus one device blocks from the last device block and accesses this device block that is N device blocks from the end of the tape. In alternative implementations, the tape read/write head may be located to the end of the tape and begin reading backwards N data sets until the directory is rebuilt or locate the tape read/write head to a calculated position at least N data sets before the last data set and rebuild data sets in a forward direction. Still further, the head may be placed upstream of the end of the tape or at another position. The method selected for locating the read/write head to rebuild data sets may be determined by the capabilities of the drive or the recording format or the physical proximity to the starting and ending point of this area of tape to process. In certain instances, performing a short locate then a read may have better performance than locating the tape read/write head physically across the area to be read.

The tape directory entry number 54 (FIG. 2) in the accessed device block is determined (at block 212). If (at block 214) the entry in the tape directory 8 at the determined entry number does not have an entry, i.e., is empty, then the tape drive controller 12 enters (at block 216) the tape directory entry 56 (FIG. 2) encoded in the accessed device block to the determined entry number in the tape directory 8, thereby recovering the tape directory entry from the device block. Alternatively, already filled entries in the tape directory 8 may be overwritten, thereby eliminating the need to determine an entry number that is entry.

When accessing the device block, the tape drive controller 12 further determines (at block 220) whether the accessed device block spans a physical location for which there is a corresponding entry in the tape directory 8. If so, then the tape drive controller 12 determines (at block 222) the tape directory entry number corresponding to the physical location and adds (at block 224) an entry 80 (FIG. 3) to the tape directory 12 for the determined entry number, indicating the spanned physical location 84, information 86 identifying the device block spanning the physical location, information 88 identifying the first logical block in the device block at or following the spanned physical location, etc. If (at block 226) the tape head is not currently accessing the last device block on the tape 4 (or an end of an area of interest, such as a first block on tape, first or last block in an area of interest, etc.), then the tape drive controller 12 moves (at block 228) the tape or tape head to the next device block on the tape 4 and returns to block 228 to recover a device block entry from the next device block. In alternative implementations, the tape may be moved forwards (i+1) or backwards (i−1). If (at block 226) the tape head is currently accessing the last device block on tape 4, then control ends.

With the logic of FIG. 6, the tape drive controller 12 rebuilds tape directory entries from entries encoded into the device blocks. Further, with the described logic of FIG. 6, the tape drive controller need only read a limited number of device blocks from the end of the tape that include the number of entries in the tape directory. In implementations where multiple tape directory entries are encoded in each device block, the tape drive controller 12 would read a number of device blocks from the end of tape that is less than the number of directory entries, and most likely substantially less than the number of device blocks on the tape. This is an improvement over the prior art where tape drive controllers read every device block on tape to rebuild the tape directory. Moreover, when accessing the last N device blocks to rebuild the tape directory (where N corresponds to the number of entries in the tape directory to rebuild, or less), the tape drive controller would rebuild entries in the tape directory when reading a device block that spans a physical location corresponding to an entry. This ensures that all entries are rebuilt in the case later added directory 8 entries were not encoded in device blocks written to tape.

Additional Implementation Details

The described techniques for maintaining tape directory information may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In the described implementations, data was organized into wrap sections in the user data sections. In alternative implementations, the data in the user data sections may be organized into physically consecutive groups of tracks other than wrap sections.

In described implementations, logical blocks from a host were stored in a device block having specific fields. In alternative implementations, the device blocks including the logical blocks stored on tape may have different fields or additional fields to those described above.

The described implementations provide a technique for transferring data to a tape drive. Additionally, the above described logic may be used with other input/output (I/O) devices or other storage devices, e.g., optical tape.

The described implementations utilized serpentine Linear Tape Open (LTO) technology. In alternative implementations, alternative tape technologies may be used, such as helical-scan tape drive that read/write vertical or diagonal tracks on the tape using a rotating read/write head and parallel tape drives that read/write tracks in parallel during one scan through the tape. The described implementations may be utilized with Digital Linear Tape (DLT), Quarter Inch Cassette (QIC), Travan, and any other tape technology known in the art.

The logic implementation of FIGS. 4 and 6 described specific operations as occurring in a particular order. In alternative implementations, certain of the logic operations may be performed in a different order, modified or removed and still implement preferred embodiments of the present invention. Morever, steps may be added to the above described logic and still conform to implementations of the invention.

Figure 7:
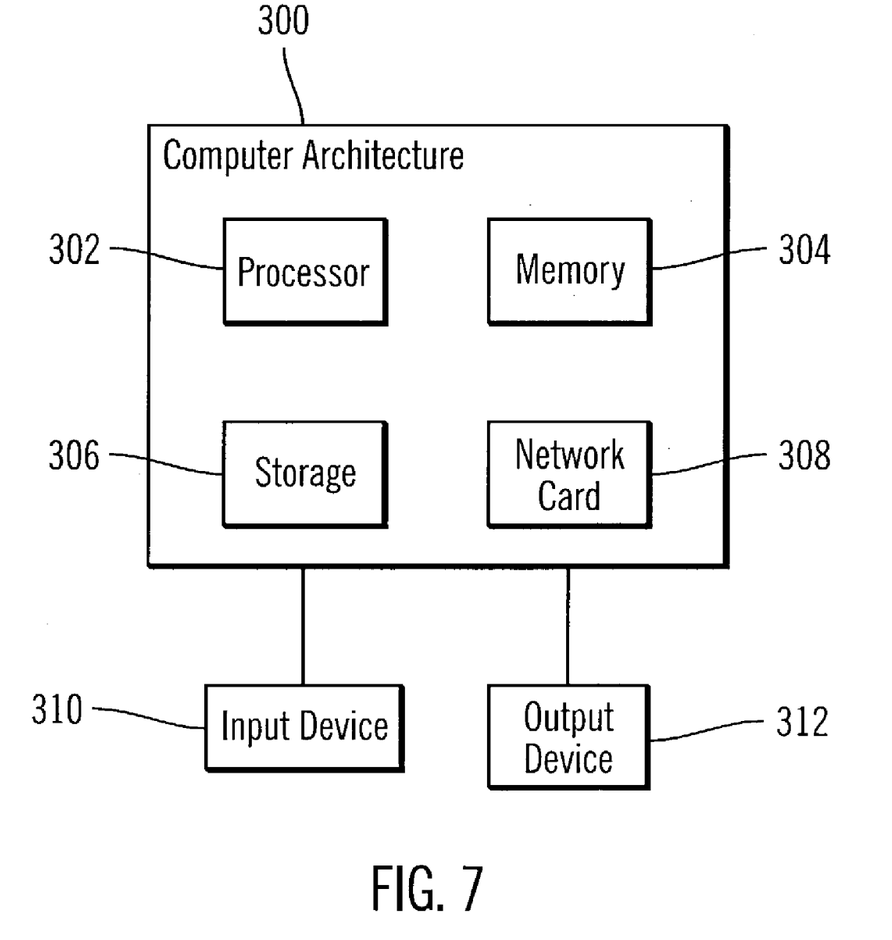
FIG. 7 illustrates an architecture of computing components in the computing environment, such as the host and tape drive, and any other computing devices.

FIG. 7 illustrates one implementation of a computer architecture 300 that may be used in the host 20 and tape driver 10 (FIG. 1). The architecture 300 may include a processor 302 (e.g., a microprocessor), a memory 304 (e.g., a volatile memory device), and storage 306 (e.g., a non-volatile storage, such as magnetic disk drives, optical disk drives, a tape drive, etc.). The storage 306 may comprise an internal storage device or an attached or network accessible storage. Programs in the storage 306 are loaded into the memory 304 and executed by the processor 302 in a manner known in the art. The architecture further includes a network card 308 to enable communication with a network. An input device 310 is used to provide user input to the processor 302, and may include a keyboard, mouse, pen-stylus, microphone, touch sensitive display screen, or any other activation or input mechanism known in the art. An output device 312 is capable of rendering information transmitted from the processor 302, or other component, such as a display monitor, printer, storage, etc.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for encoding data onto a storage medium, comprising:
   receiving host data;
   generating a plurality of device blocks to include the host data;
   generating a directory including entries for physical locations on the storage medium, wherein each of a plurality of the directory entries identifies one device block at the physical location corresponding to the entry, wherein the directory is used to access data on the storage medium;
encoding the directory entries in the device blocks;
writing the device blocks to the storage medium; and
if one device block is written to one physical location, then adding one entry to the directory for the physical location to which the device block is written identifying the written device block, wherein the added directory entry is encoded into at least one device block subsequently written to the storage medium.

2. The method of claim 1, wherein each of the plurality of the directory entries indicates the host data in the device block at the physical location corresponding to the entry.

3. The method of claim 1, further comprising:
for each entry encoded within one device block, encoding a number of the directory entry within the device block.

4. The method of claim 1, wherein each of the plurality of the directory entries is encoded into a plurality of device blocks.

5. The method of claim 1, wherein at least one directory entry is encoded into each device block.

6. The method of claim 1, wherein the storage medium comprises magnetic tape, and wherein the device blocks are written sequentially to the magnetic tape.

7. A method for encoding data onto a storage medium, comprising:
receiving host data;
generating a plurality of device blocks to include the host data;
generating a directory including entries for physical locations on the storage medium, wherein each of a plurality of the directory entries identifies one device block at the physical location corresponding to the entry, wherein the directory is used to access data on the storage medium;
encoding the directory entries within the device blocks written to the storage medium for a current device block by:
determining a previous directory entry encoded in a last device block written to the storage medium;
if the previous directory entry is a last entry in the directory, then encoding a first entry in the directory into the current device block; and
if the previous directory entry is not the last entry, then encoding one directory entry following the previous directory entry into the current device block.

8. A method for rebuilding a directory having entries providing information on data written to a storage medium at corresponding physical locations of the storage medium, comprising:
determining a number of physical locations to which device blocks are written on the storage medium;
reading a number of device blocks written to the storage medium that include a number of directory entries equal to the determined number of physical locations, wherein the device blocks are encoded with at least one directory entry; and
writing the directory entry encoded in the read device blocks into the directory to rebuild the directory.

9. The method of claim 8, wherein at least one directory entry is encoded in each device block, wherein the number of read device blocks is equal to or less than the determined number of physical locations.

10. The method of claim 8, wherein reading device blocks comprises reading a plurality of device blocks sequentially from a last written device block to the storage medium.

11. The method of claim 8, further comprising:
determining whether the read device blocks span one physical location;
generating a directory entry for the physical location spanned by the read device block including information on the read device block if the read device block spans one physical location; and
adding the generated directory entry to the directory.

12. A system for encoding data, comprising:
a storage medium;
means for receiving host data;
means for generating a plurality of device blocks to include the host data;
means for generating a directory including entries for physical locations on the storage medium, wherein each of a plurality of the directory entries identifies one device block at the physical location corresponding to the entry, wherein the directory is used to access data on the storage medium;
means for encoding the directory entries in the device blocks;
means for writing the device blocks to the storage medium; and
means for adding one entry to the directory for the physical location to which the device block is written identifying the written device block if one device block is written to one physical location, wherein the added directory entry is encoded into at least one device block subsequently written to the storage medium.

13. The system of claim 12, wherein each of the plurality of directory entries indicates the host data in the device block at the physical location corresponding to the entry.

14. A system for encoding data, comprising:
a storage medium;
means for receiving host data;
means for generating a plurality of device blocks to include the host data;
means for generating a directory including entries for physical locations on the storage medium, wherein each of a plurality of the directory entries identifies one device block at the physical location corresponding to the entry, wherein the directory is used to access data on the storage medium;
means for encoding the directory entries within the device blocks written to the storage medium by:
determining a previous directory entry encoded in a last device block written to the storage medium;
if the previous directory entry is a last entry in the directory, then encoding a first entry in the directory into the current device block; and
if the previous directory entry is not the last entry, then encoding one directory entry following the previous directory entry into the current device block.

15. A system, comprising:
a storage medium;
an information bearing medium including a directory having entries providing information on data written to the storage medium at corresponding physical locations of the storage medium;
means for determining a number of physical locations to which device blocks are written on the storage medium;
means for reading a number of device blocks written to the storage medium that include a number of directory entries equal to the determined number of physical locations, wherein the device blocks are encoded with at least one directory entry; and means for writing the directory entry encoded in the read device blocks into the directory to rebuild the directory.

16. A device for encoding data onto a storage medium, wherein the device causes operations to be performed, the operations comprising:

receiving host data;

generating a plurality of device blocks to include the host data;

generating a directory including entries for physical locations on the storage medium, wherein each of a plurality of the directory entries identifies one device block at the physical location corresponding to the entry, wherein the directory is used to access data on the storage medium;

encoding the directory entries in the device blocks;

writing the device blocks to the storage medium; and if one device block is written to one physical location, then adding one entry to the directory for the physical location to which the device block is written identifying the written device block, wherein the added directory entry is encoded into at least one device block subsequently written to the storage medium.

17. The device of claim 16, wherein each of the plurality of the directory entries indicates the host data in the device block at the physical location corresponding to the entry.

18. The device of claim 16, further comprising:

for each entry encoded within one device block, encoding a number of the directory entry within the device block.

19. The device of claim 16, wherein each of the plurality of directory entries is encoded into a plurality of device blocks.

20. The device of claim 16, wherein at least one directory entry is encoded into each device block.

21. The device of claim 16, wherein the storage medium comprises magnetic tape, and wherein the device blocks are written sequentially to the magnetic tape.

22. A device for encoding data onto a storage medium, wherein the device causes operations to be performed, the operations comprising:

receiving host data;

generating a plurality of device blocks to include the host data;

generating a directory including entries for physical locations on the storage medium, wherein each of a plurality of the directory entries identifies one device block at the physical location corresponding to the entry, wherein the directory is used to access data on the storage medium;

encoding the directory entries within the device blocks written to the storage medium for a current device block by:

determining a previous directory entry encoded in a last device block written to the storage medium;

if the previous directory entry is a last entry in the directory, then encoding a first entry in the directory into the current device block; and if the previous directory entry is not the last entry, then encoding one directory entry following the previous directory entry into the current device block.

23. A device implementing code for rebuilding a directory having entries providing information on data written to a storage medium at corresponding physical locations of the storage medium, wherein the code is executed to cause operations to be performed, the operations comprising:

reading a plurality of device blocks written to the storage medium sequentially from a last written device block to the storage medium, wherein the device blocks are encoded with at least one directory entry and host data; and writing the directory entry encoded in the read device blocks into the directory to rebuild the directory.

24. The device of claim 23, wherein the operations further comprise:

determining whether the read device blocks span one physical location;

generating a directory entry for the physical location spanned by the read device block including information on the read device block if the read device block spans one physical location; and adding the generated directory entry to the directory.

25. A device implementing code for rebuilding a directory having entries providing information on data written to a storage medium at corresponding physical locations of the storage medium, wherein the code is executed to cause operations to be performed, the operations comprising:

determining a number of physical locations to which device blocks are written on the storage medium;

reading a number of device blocks written to the storage medium that include a number of directory entries equal to the determined number of physical locations, wherein the device blocks are encoded with at least one directory entry; and writing the directory entry encoded in the read device blocks into the directory to rebuild the directory.

26. The device of claim 25, wherein at least one directory entry is encoded in each device block, wherein the number of read device blocks is equal to or less than the determined number of physical locations.

* * * * *